UNITED STATES PATENT OFFICE.

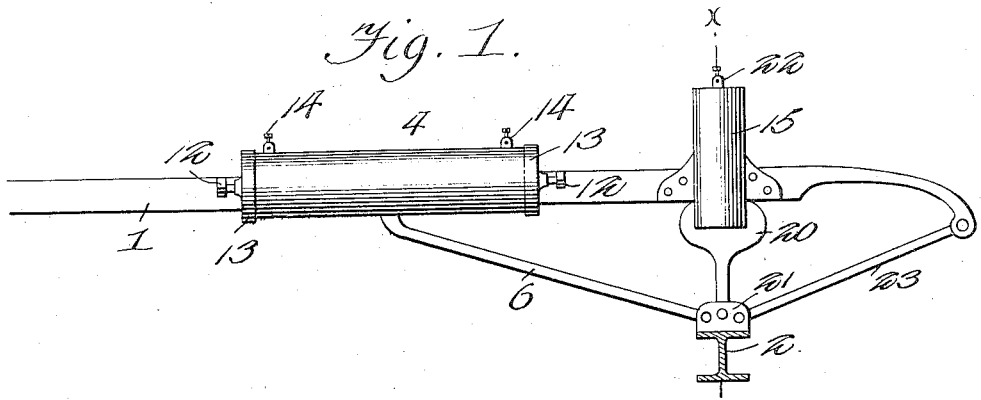
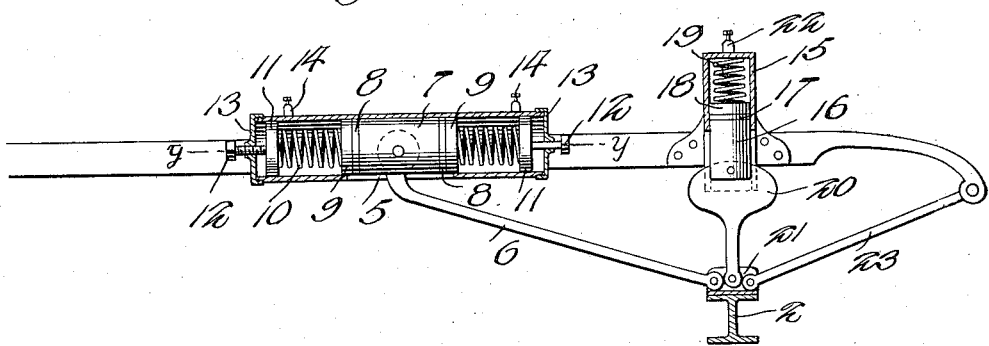
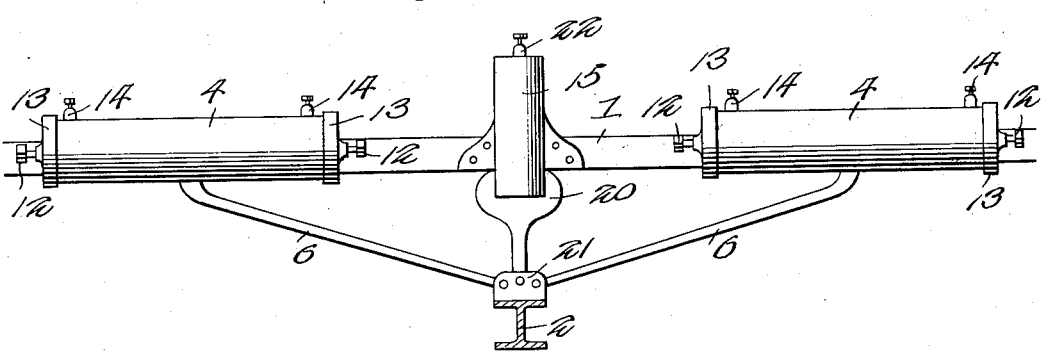

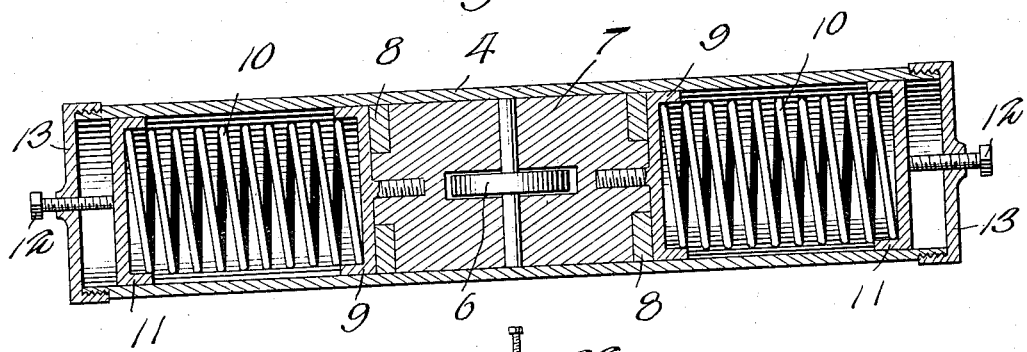
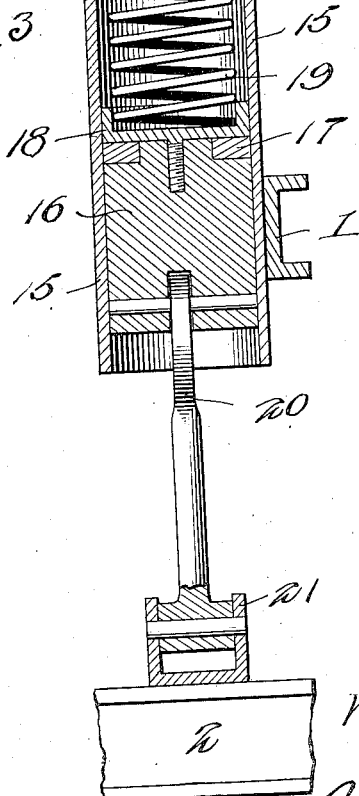

WILLIAM L. SCHOU, OF DUARTE, CALIFORNIA.

AUTOMOBILE SHOCK-ABSORBER.

1,046,338. Specification of Letters Patent. Patented Dec. 3, 1912.

Application filed July 5, 1910. Serial No. 570,470.

*To all whom it may concern:*

Be it known that I, WILLIAM L. SCHOU, a citizen of the United States, residing at Duarte, in the county of Los Angeles and State of California, have invented new and useful Improvements in Automobile Shock-Absorbers, of which the following is a specification.

The present invention aims to supply means for neutralizing vibration and shock in the construction of vehicles chiefly and of the type driven by mechanical power, said means being designed to replace the usual springs of the elliptic or semi-elliptic type, thereby enabling the frame to be reduced in length and resulting in economy of space in the assemblage of parts.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a side view of a shock absorber shown applied to the front portion of the chassis or main frame of an automobile embodying the invention. Fig. 2 is a vertical longitudinal section of the shock absorber. Fig. 3 is a vertical transverse section on the line $x$—$x$ of Fig. 1. Fig. 4 is a horizontal section on the line $y$—$y$ of Fig. 2. Fig. 5 is a detail view of a modification.

Corresponding and like parts are referred to in the following description, and indicated in all the views of the drawings, by the same reference characters.

The numeral 1 designates the longitudinal bar of the main frame or chassis of an automobile and 2 the axle thereof. A horizontal and a vertical shock absorber are provided and secured to the main frame and have connection with the axle 2. Each shock absorber consists essentially of a cylinder or barrel and a piston arranged to operate therein, a spring or springs being provided to coöperate with the pistons to neutralize the shock or vibration.

The horizontal shock absorber comprises a cylinder 4, which is secured to the main frame in any substantial manner. A longitudinal slot 5 is formed in a side of the cylinder and provides clearance for a connecting rod or bar 6, which is pivotally connected to the piston 7 arranged to operate in the cylinder 4. The piston 7 has its ends reduced to receive packing 8, whereby a close joint is maintained between the piston and the inner walls of the cylinder. A cap 9 is secured to each end of the piston and serves to confine the packing 8 and also forms a seat for a spring 10, one of such springs being provided for each end of the cylinder. A cup 11 is provided for each end portion of the cylinder and receives the outer ends of the spring 10. A set screw 12 is threaded into a cap 13, which is connected with the outer end of the cylinder by means of a screwthread joint, thereby admitting of the cap being readily detached from the cylinder or fitted thereto. By manipulating the set screw 12 the tension of the spring 10 may be regulated. It is to be understood that each end of the cylinder 4 is similarly equipped and that the piston 7 is held between two springs 10, said springs being of the expansible helical type so as to be compressed by movement of the piston toward either end of the cylinder. Vent openings 14 are located near the outer ends of the cylinder 4, so as to retard the entrance and the exit of air. The vent openings 14 are provided with valves for regulating their effective size, thereby controlling the rapidity of ingress or egress of the air. The horizontal shock absorber is located to one side of a line passing vertically through the axle 2 and the connecting rod or bar 6 inclines to the horizontal and as a result of this arrangement of parts a vertical movement of the axle causes the piston 7 to reciprocate in the cylinder 4.

The vertical shock absorber consists of a cylinder or barrel 15, which is firmly secured to the main frame in any substantial way. A piston 16 is arranged to operate in the cylinder 15. The upper end of the piston 16 is reduced and receives a packing 17 and a cap 18, the latter serving to confine the packing 17 and to provide a seat for a spring 19, which is located in the upper end of the cylinder, said spring being of the expansive helical type. A rod or connector 20 is pivotally attached at its upper end to the piston 16 and is secured at its lower end by means of a pivot fastening to a clip 21, which is of substantially U-form. The upper end of the rod or connector 20 is widened and fits snugly within a slot formed in the lower end of the piston 16 and in slots formed in opposite sides of the lower end of the cylinder 15. The upper edge of the widened end of the rod or connector 20 is made rounding, thereby permitting said rod or connector to oscillate freely. By having the upper end of the rod or connector 20 widened and entering slots formed in the piston and cylinder both the piston and rod 20 are prevented from turning about a vertical line and the slots in the sides of the cylinder serve to direct the rod 20 in its vertical movements. A vent 22 is provided in the upper end of the cylinder 15 and is adapted to be regulated by means of a valve, so that the air entering and leaving the cylinder may be regulated, thereby retarding the movements of the piston 16 to a greater or less extent.

The clip 21 has the lower ends of the rods or connectors 6 and 20 pivotally attached thereto. A rod or bar 23 is pivotally connected at its lower end to the clip 21 and has its upper end secured to the main frame by means of a pivot fastening. The clip 21 is also secured to the axle 2 in any manner. As the axle tends to move vertically incident to vibration or shock the pistons move in their respective cylinders against the tension of the springs located in said cylinders, thereby neutralizing the shock or vibration. The movement of the pistons in their cylinders is retarded more or less by the effective size of the vent openings, which admit of the air escaping or entering the cylinders more or less rapidly. By having the rod or connector 20 pivoted to the piston 16 and to the clip 21 it is adapted to oscillate, thereby preventing binding.

The construction shown in Figs. 1 and 2 admits of the invention being adapted to automobiles or like mechanically propelled machines as generally constructed, the shock absorbers and connection replacing the usual semi-elliptical springs employed for connecting the front axle to the front portion of the frame. Fig. 5 shows a construction in which two horizontal shock absorbers are provided and located upon opposite sides of the vertical shock absorber, the horizontal shock absorbers and the vertical shock absorber being constructed substantially as corresponding parts illustrated in Figs. 1 and 2. In this arrangement the axle is adapted to move in a vertical line, since the pistons of the horizontal shock absorbers move alike in opposite directions. Inasmuch as the parts of the respective vertical and horizontal shock absorbers are constructed substantially as corresponding parts illustrated in Figs. 1 and 2 a detailed description is not deemed necessary.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a shock absorber the combination of a frame, a load sustainer, a vertically arranged shock absorber mounted upon the frame in line with the load sustainer, a horizontal shock absorber mounted upon the frame at one side of the load sustainer and the vertically arranged shock absorber, a vertical connector pivoted to the load sustainer and to the vertical shock absorber, and oppositely inclined connectors having their inner ends pivoted to the load sustainer and having their outer ends connected with the said frame, one of said connections being yieldable.

2. In a shock absorber, the combination of a frame, a load sustainer, a vertically arranged shock absorber mounted upon the frame and comprising a cylinder having slots in opposite sides and a piston arranged to operate in the cylinder and having a slot in one end in register with the slots of the cylinder, a horizontal shock absorber mounted upon the frame at one side of the vertical shock absorber and the load sustainer, a connector pivoted at one end to the load sustainer and having its opposite end widened and fitted in the registering slots of the cylinder and piston of the vertical shock absorber and pivoted to the piston thereof, and oppositely inclined connectors pivoted at their inner ends to the load sustainer and having pivotal connection at their outer ends with the frame, one of said connections being yieldable.

3. In combination a frame, horizontally arranged shock absorbers attached to the frame and spaced apart, a vertical shock absorber attached to the frame at a point midway between the horizontal shock absorbers, a load sustainer in line with the vertical shock absorber, a connector pivotally attached at its ends to the load sustainer and to the vertical shock absorber, and other connectors having their inner ends pivoted to the load sustainer and inclining in opposite directions and having their outer ends pivotally connected to the horizontal shock absorbers.

In testimony whereof I affix my signature in presence of two witnesses.

WILLIAM L. SCHOU.

Witnesses:
H. KIRCHENSCHLAGEN,
A. F. FORD.